United States Patent
Hartnett et al.

(10) Patent No.: US 11,358,598 B2
(45) Date of Patent: Jun. 14, 2022

(54) METHODS AND SYSTEMS FOR PERFORMING OUTLET INFERENCE BY AN AUTONOMOUS VEHICLE TO DETERMINE FEASIBLE PATHS THROUGH AN INTERSECTION

(71) Applicant: Argo AI, LLC, Pittsburgh, PA (US)

(72) Inventors: Andrew T. Hartnett, West Hartford, CT (US); G. Peter K. Carr, Allison Park, PA (US); Greydon Foil, Pittsburgh, PA (US); Constantin Savtchenko, Sewickley, PA (US)

(73) Assignee: Argo AI, LLC, Pittsburgh, PA (US)

( * ) Notice: Subject to any disclaimer, the term of this patent is extended or adjusted under 35 U.S.C. 154(b) by 161 days.

(21) Appl. No.: 17/060,817

(22) Filed: Oct. 1, 2020

(65) Prior Publication Data
US 2022/0105940 A1     Apr. 7, 2022

(51) Int. Cl.
*B60W 30/18*     (2012.01)
*B60W 60/00*     (2020.01)

(52) U.S. Cl.
CPC .. *B60W 30/18159* (2020.02); *B60W 60/0011* (2020.02); *B60W 2552/53* (2020.02); *B60W 2556/40* (2020.02)

(58) Field of Classification Search
CPC ....... B60W 30/18159; B60W 60/0011; B60W 2552/53; B60W 2556/40
See application file for complete search history.

(56) References Cited

U.S. PATENT DOCUMENTS

| | | |
|---|---|---|
| 6,510,388 B1 | 1/2003 | Sporrong et al. |
| 6,820,006 B2 | 11/2004 | Patera |
| 8,146,703 B2 | 4/2012 | Baumann et al. |
| 8,340,883 B2 | 12/2012 | Arbitmann et al. |
| 8,755,998 B2 | 6/2014 | Braennstroem et al. |
| 9,229,453 B1 | 1/2016 | Lee |
| 9,248,834 B1 * | 2/2016 | Ferguson .......... B60W 60/0027 |

(Continued)

FOREIGN PATENT DOCUMENTS

| | | |
|---|---|---|
| EP | 3552921 A1 | 10/2019 |
| JP | 2002-236994 A | 8/2002 |

(Continued)

OTHER PUBLICATIONS

U.S. Appl. No. 17/352,823, filed Jun. 21, 2021, Systems and Methods for Trajectory Based Safekeeping of Vehicles.

(Continued)

*Primary Examiner* — Ryan Rink
(74) *Attorney, Agent, or Firm* — Fox Rothschild LLP

(57) ABSTRACT

An autonomous vehicle identifies an intersection, identifies an object in proximity to the intersection, identifies a plurality of outlets of the intersection, and, for each outlet, identifies a polyline associated with the outlet, identifies a target point along the polyline, and determines a constant curvature path from the object to the target point. The system determines a score associated with each outlet based at least in part on the constant curvature path of the outlet, generates a pruned set of outlets that includes one or more of the outlets from the plurality of outlets based on its score, and for each outlet in the pruned set, generates a reference path from the object to the target point of the outlet.

34 Claims, 9 Drawing Sheets

(56) References Cited

U.S. PATENT DOCUMENTS

| | | |
|---|---|---|
| 9,428,196 B2 | 8/2016 | Ono |
| 9,495,874 B1 | 11/2016 | Zhu et al. |
| 9,517,767 B1 | 12/2016 | Kentley et al. |
| 9,555,781 B2 | 1/2017 | Breuer et al. |
| 9,630,619 B1 | 4/2017 | Kentley et al. |
| 10,005,464 B2 | 6/2018 | Toyoda et al. |
| 10,026,318 B2 | 7/2018 | Maeda et al. |
| 10,037,694 B2 | 7/2018 | Lee |
| 10,046,761 B2 | 8/2018 | Meyer et al. |
| 10,360,800 B2 | 7/2019 | Bender et al. |
| 10,496,091 B1* | 12/2019 | Ross .................. G06N 5/04 |
| 10,509,413 B2 | 12/2019 | Mou |
| 10,564,639 B1 | 2/2020 | Zhu et al. |
| 10,745,003 B2 | 8/2020 | Kentley-Klay et al. |
| 10,928,820 B1* | 2/2021 | Tao .................. G05D 1/0214 |
| 2003/0055563 A1 | 3/2003 | Jonas Lars et al. |
| 2008/0084283 A1 | 4/2008 | Kalik |
| 2011/0213513 A1* | 9/2011 | Naderhirn .......... G05D 1/0202 |
| | | 701/3 |
| 2013/0253816 A1 | 9/2013 | Caminiti et al. |
| 2017/0039855 A1 | 2/2017 | Maeda et al. |
| 2017/0057498 A1 | 3/2017 | Katoh |
| 2017/0120803 A1 | 5/2017 | Kentley et al. |
| 2017/0120902 A1 | 5/2017 | Kentley et al. |
| 2017/0217431 A1 | 8/2017 | Class et al. |
| 2017/0297568 A1 | 10/2017 | Kentley et al. |
| 2017/0329332 A1 | 11/2017 | Pilarski et al. |
| 2018/0099663 A1* | 4/2018 | Diedrich .............. B60W 30/09 |
| 2018/0099665 A1* | 4/2018 | You .................. B60Q 9/008 |
| 2018/0148052 A1* | 5/2018 | Suto .............. B60W 30/18154 |
| 2018/0257647 A1 | 9/2018 | Jurca et al. |
| 2019/0025841 A1 | 1/2019 | Haynes et al. |
| 2019/0225150 A1 | 7/2019 | Nohl et al. |
| 2019/0291726 A1 | 9/2019 | Shalev-Shwartz et al. |
| 2019/0291727 A1 | 9/2019 | Shalev-Shwartz et al. |
| 2019/0310644 A1* | 10/2019 | Zhang .................. G05D 1/0217 |
| 2019/0333373 A1 | 10/2019 | Fang et al. |
| 2020/0026277 A1 | 1/2020 | Palanisamy et al. |
| 2020/0086855 A1 | 3/2020 | Packer et al. |
| 2020/0111366 A1 | 4/2020 | Nanri et al. |
| 2020/0124424 A1* | 4/2020 | Shibahata .............. G01C 21/34 |
| 2020/0262418 A1 | 8/2020 | Lin |
| 2021/0031760 A1 | 2/2021 | Ostafew et al. |
| 2021/0035447 A1* | 2/2021 | Urano .............. B60W 60/0027 |
| 2021/0107476 A1 | 4/2021 | Cui |
| 2021/0181749 A1* | 6/2021 | Pan .................. G05D 1/0221 |
| 2021/0389133 A1* | 12/2021 | Brizzi .................. G01C 21/30 |
| 2022/0105928 A1* | 4/2022 | Foil .................. B60W 40/072 |

FOREIGN PATENT DOCUMENTS

| | | |
|---|---|---|
| JP | 2004301667 A | 10/2004 |
| JP | 20100228740 A | 10/2010 |
| JP | 2016122308 A | 7/2016 |
| KR | 10-2018-0040014 A | 4/2018 |
| KR | 20180104496 A | 9/2018 |
| WO | 2016094088 A1 | 6/2016 |

OTHER PUBLICATIONS

U.S. Appl. No. 17/060,928, filed Oct. 1, 2020, Systems and Methods for Imminent Collision Avoidance.

U.S. Appl. No. 17/207,889, filed Mar. 22, 2021, Methods and Systems for Autonomous Vehicle Inference of Routes for Actors Exhibiting Unrecognized Behavior.

U.S. Appl. No. 17/060,837, filed Oct. 1, 2020, Methods and Systems for Predicting Actions of an Object by an Autonomous Vehicle to Determine Feasible Paths Through a Conflicted Area.

Horst, John et al., "Trajectory Generation for an On-Road Autonomous Vehicle," The National Institute of Standards and Technolgoy, pp. 1-9, Sep. 2005.

Information about Related Patents and Patent Applications, see section 6 of the accompanying Information Disclosure Statement Letter, which concerns Related Patents and Patent Applications.

U.S. Appl. No. 16/547,712, filed Aug. 22, 2019, Systems and Methods for Trajectory Based Safekeeping of Vehicles.

U.S. Appl. No. 16/547,718, filed Aug. 22, 2019, Systems and Methods for Trajectory Based Safekeeping of Vehicles.

\* cited by examiner $y_c = y_0 + \delta \quad \Rightarrow \quad \delta = y_c - y_0$ $\delta^2 + x_0^2 = y_c^2$

---

$(y_c - y_0)^2 + x_0^2 = y_c^2$ $\cancel{y_c^2} - 2y_cy_0 + y_0^2 + x_0^2 = \cancel{y_c^2}$ $$\boxed{y_c = \frac{x_0^2 + y_0^2}{2y_0}}$$ ← distance b/w points

FIG. 4B

METHODS AND SYSTEMS FOR PERFORMING OUTLET INFERENCE BY AN AUTONOMOUS VEHICLE TO DETERMINE FEASIBLE PATHS THROUGH AN INTERSECTION

BACKGROUND

Many autonomous vehicle programs rely heavily on mapped lane segments. These may include, for example, programs that are used for performing tracking, prediction and/or planning by an autonomous vehicle. However, mapped lane segments may not always provide an accurate representation of actual vehicle paths through intersections. As an example, a vehicle that takes a left turn at a relatively high speed may follow a shallower trajectory than represented by a mapped lane through the intersection. As such, within intersections, potential trajectories become more diverse, and it becomes more difficult for an autonomous vehicle to accurately predict which trajectory a vehicle will follow.

SUMMARY

In various implementations, a system includes one or more electronic devices of an autonomous vehicle, and a computer-readable storage medium comprising one or more programming instructions that, when executed, cause one or more of the electronic devices to perform one or more actions. The system identifies an intersection, identifies an object in proximity to the intersection, identifies a plurality of outlets of the intersection, and, for each outlet, identifies a polyline associated with the outlet, identifies a target point along the polyline, and determines a constant curvature path from the object to the target point. The system determines a score associated with each outlet based at least in part on the constant curvature path of the outlet, generates a pruned set of outlets that includes one or more of the outlets from the plurality of outlets based on its score, and for each outlet in the pruned set, generates a reference path from the object to the target point of the outlet.

In some implementations, the system may use one or more of the generated reference paths to predict a trajectory of the object through the intersection, and adjust one or more driving operations of the autonomous vehicle based on the trajectory of the object through the intersection that is predicted.

The system may identify a target point along the polyline by identifying a target point located a certain distance from an end of the outlet.

The system may determine a constant curvature path from the object to the target point by fitting a circle to the object and the target point in an object frame. The system may perform this fitting by locating a center of rotation of the object at an origin position, applying a point constraint and a slope constraint on the circle such that the circle passes through the origin position, and applying a second point constraint on the circle such that the circle passes through the target point.

In some implementations, the system may determine a score associated with each outlet by determining a heading discrepancy value, determining a curvature parameter, determining a lateral acceleration of the object, and summing the heading discrepancy value, the curvature parameter, and the lateral acceleration. Determining a heading discrepancy value may involve determining a cosine distance at the target point of the outlet. The system may determine a curvature parameter by applying a function to a curvature of the constant curvature path. The result of the function may be a first value if the curvature of the constant curvature path is too tight to traverse the outlet. The result may be a second value if the curvature of the constant curvature path is not too tight to traverse the outlet. The system may determine a lateral acceleration of the object by identifying a curvature of the constant curvature path of the outlet, determining a velocity of the object, squaring the velocity of the object to generate a squared value, and determining a product of the curvature and the squared value.

In some implementations, the system may generate a pruned set of outlets by identifying one or more outlets from the plurality of outlets whose score is less than a threshold value.

The system may generate a reference path from the moving object to the target point of the outlet by generating a spline between the object and the target point in a map frame. One or more of the reference paths may not aligned with mapped lane segments of a map frame.

The system may, for one or more of the generated reference paths, determine one or more mapped lane segments that lead to the outlet associated with the reference path, and determine whether one or more of the mapped lane segments match the reference path. In response to determining that only one of the mapped lane segments match the reference path, the system may apply at least a portion of metadata associated with the one mapped lane segment to the reference path. In response to determining that multiple mapped lane segments match the reference path and that the multiple mapped lane segments have the same metadata, the system may apply at least a portion of metadata associated with one of the multiple mapped lane segments to the reference path. In response to determining that there are no mapped lane segments that match the reference path, the system may apply default metadata to the reference path. The default metadata may include one or more instructions instructing the autonomous vehicle to yield to one or more actors in the intersection.

In some implementations, the system may generate a reference path from the object to the target point of the outlet by generating a reference path that is different from one or more mapped lane segments through the intersection.

BRIEF DESCRIPTION OF THE DRAWINGS

FIG. 4B illustrates an explanation example relationships pertaining to FIG. 4A.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
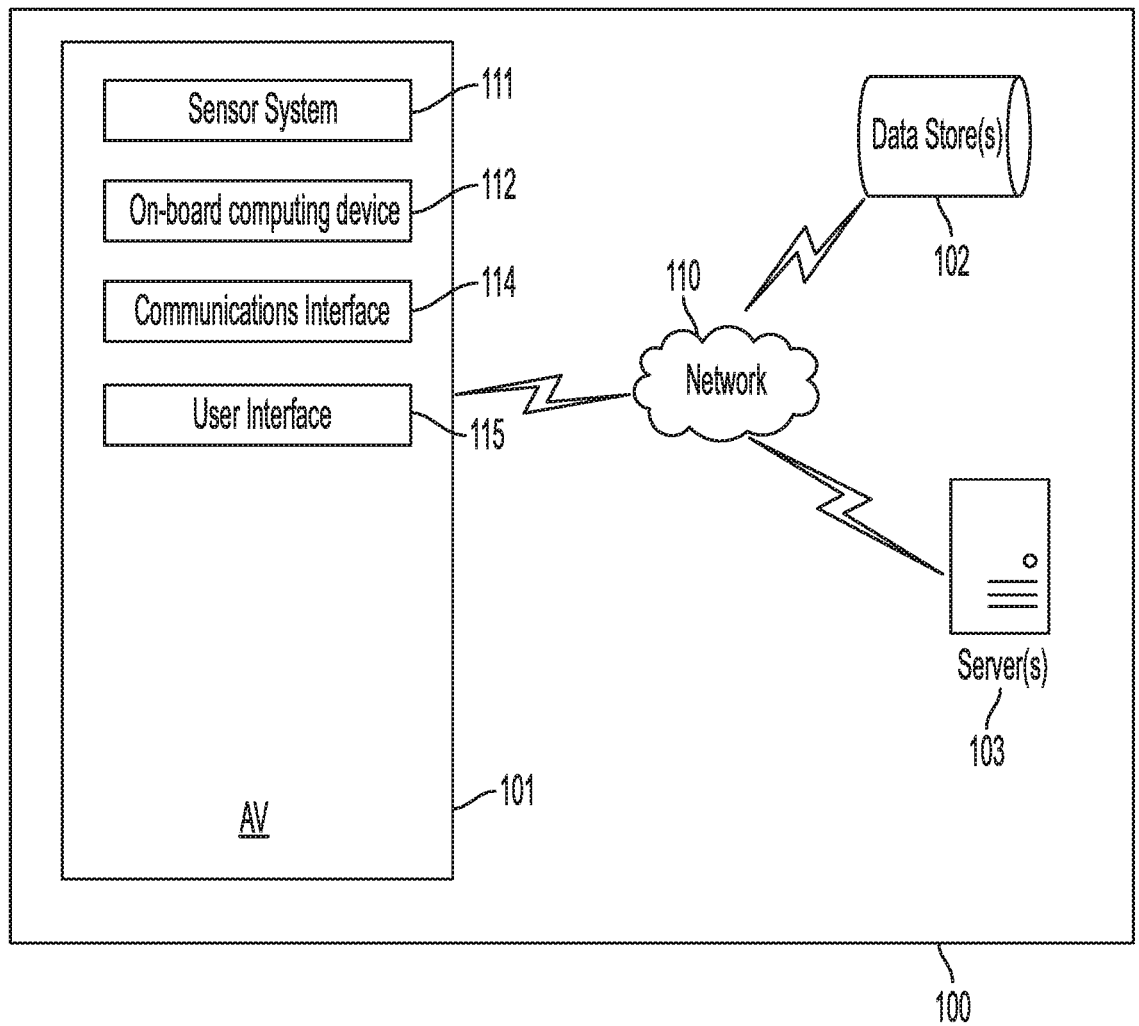
FIG. 1 is a block diagram illustrating an example autonomous vehicle system.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), traffic information data store(s), user information data store(s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, an on-board computing device 112, a communications interface 114, and a user interface 115. Autonomous vehicle 101 may further include certain components (as illustrated, for example, in FIG. 2) included in vehicles, such as, an engine, wheels, steering wheel, transmission, etc., which may be controlled by the on-board computing device 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a radio detection and ranging (RADAR) system, a laser detection and ranging (LiDAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

The LiDAR system may include a sensor configured to sense or detect objects in an environment in which the autonomous vehicle 101 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 360° horizon of the first vehicle. The LiDAR system may be configured to provide to the computing device a cloud of point data representing the surface(s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LIDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, The LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 101 such as, without limitation, other vehicles (autonomous or driven), robots, satellites, etc.

Figure 2:
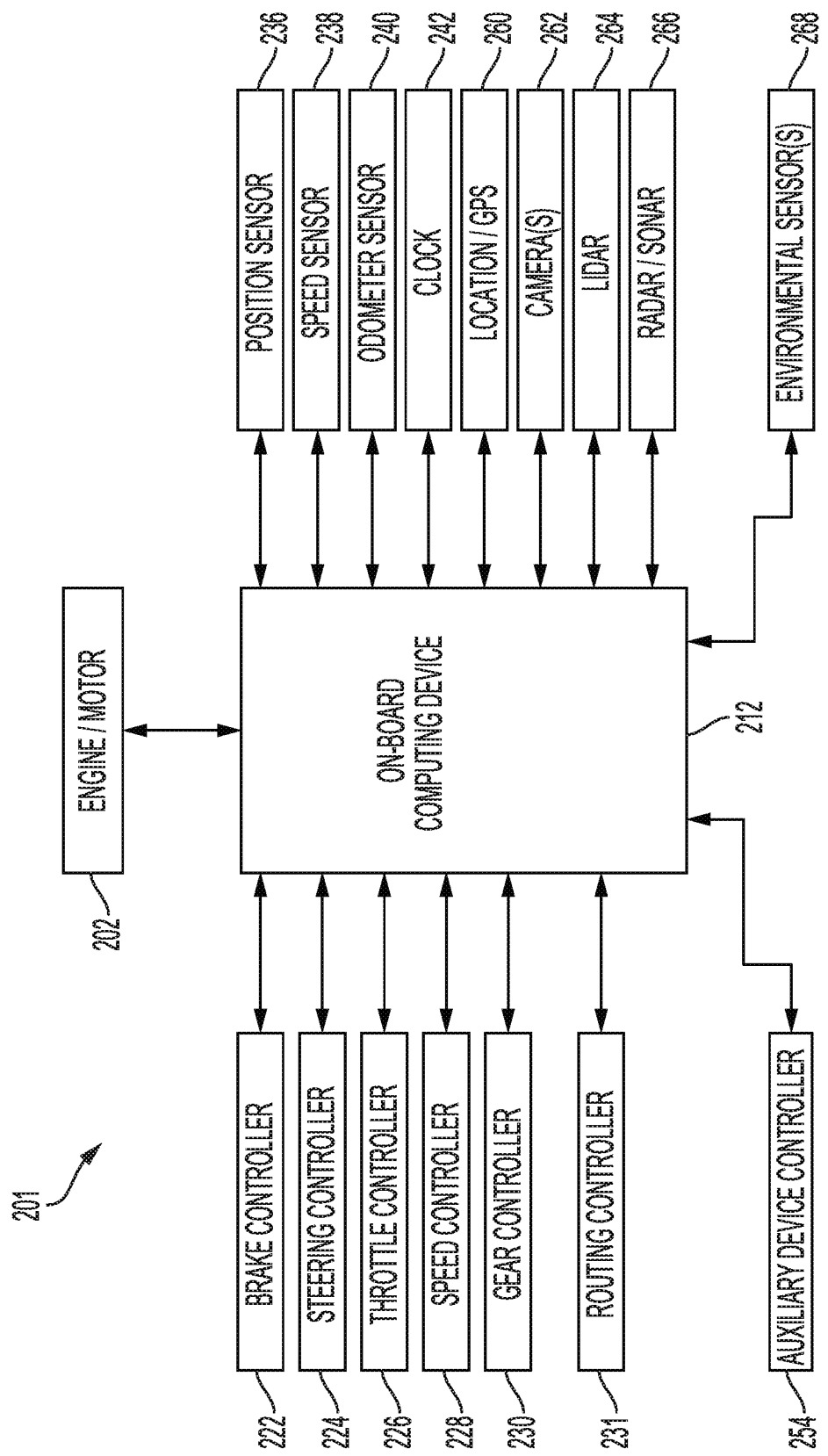
FIG. 2 illustrates an example vehicle controller system.

FIG. 2 illustrates an example system architecture for a vehicle 201, such as the autonomous vehicle 101 of FIG. 1 autonomous vehicle. The vehicle 201 may include an engine or motor 202 and various sensors for measuring various parameters of the vehicle and/or its environment. Operational parameter sensors that are common to both types of vehicles include, for example: a position sensor 236 such as an accelerometer, gyroscope and/or inertial measurement unit; a speed sensor 238; and an odometer sensor 240. The vehicle 101 also may have a clock 242 that the system architecture uses to determine vehicle time during operation. The clock 242 may be encoded into the vehicle on-board computing device 212, it may be a separate device, or multiple clocks may be available.

The vehicle 201 also may include various sensors that operate to gather information about the environment in which the vehicle is traveling. These sensors may include, for example: a location sensor 260 such as a GPS device; object detection sensors such as one or more cameras 262; a LiDAR sensor system 264; and/or a radar and or and/or a sonar system 266. The sensors also may include environmental sensors 268 such as a precipitation sensor and/or ambient temperature sensor. The object detection sensors may enable the vehicle 201 to detect moving actors and stationary objects that are within a given distance or range of the vehicle 201 in any direction, while the environmental sensors collect data about environmental conditions within the vehicle's area of travel. The system architecture will also include one or more cameras 262 for capturing images of the environment.

During operations, information is communicated from the sensors to an on-board computing device 212. The on-board computing device 212 analyzes the data captured by the sensors and optionally controls operations of the vehicle based on results of the analysis. For example, the on-board computing device 212 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers such as an auxiliary device controller 254.

Geographic location information may be communicated from the location sensor 260 to the on-board computing device 212, which may then access a map of the environment that corresponds to the location information to determine known fixed features of the environment such as streets, buildings, stop signs and/or stop/go signals. Captured images from the cameras 262 and/or object detection information captured from sensors such as a LiDAR system 264 is communicated from those sensors) to the on-board computing device 212. The object detection information and/or captured images may be processed by the on-board computing device 212 to detect objects in proximity to the vehicle 201. In addition or alternatively, the vehicle 201 may transmit any of the data to a remote server system 103 (FIG. 1) for processing. Any known or to be known technique for making an object detection based on sensor data and/or captured images can be used in the embodiments disclosed in this document.

The on-board computing device 212 may obtain, retrieve, and/or create map data that provides detailed information about the surrounding environment of the autonomous vehicle 201. The on-board computing device 212 may also determine the location, orientation, pose, etc. of the AV in the environment (localization) based on, for example, three dimensional position data (e.g., data from a GPS), three dimensional orientation data, predicted locations, or the like. For example, the on-board computing device 212 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 212 in analyzing the surrounding environment of the autonomous vehicle 201.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 212 may also include and/or may receive information relating to the trip or route of a user, real-time traffic information on the route, or the like.

The on-board computing device 212 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various implementations, an on-board computing device 212 may determine perception information of the surrounding environment of the autonomous vehicle 201. Based on the sensor data provided by one or more sensors and location information that is obtained, the on-board computing device 212 may determine perception information of the surrounding environment of the autonomous vehicle 201. The perception information may represent what an ordinary driver would perceive in the surrounding environment of a vehicle. The perception data may include information relating to one or more objects in the environment of the autonomous vehicle 201. For example, the on-board computing device 212 may process sensor data (e.g., LiDAR or RADAR data, camera images, etc.) in order to identify objects and/or features in the environment of autonomous vehicle 201. The objects may include traffic signals, road way boundaries, other vehicles, pedestrians, actors, and/or obstacles, etc. The on-board computing device 212 may use any now or hereafter known object recognition algorithms, video tracking algorithms, and computer vision algorithms (e.g., track objects frame-to-frame iteratively over a number of time periods) to determine the perception.

In some embodiments, the on-board computing device 212 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 212 may perform one or more prediction and/or forecasting operations. For example, the on-board computing device 212 may predict future locations, trajectories, and/or actions of one or more objects. For example, the on-board computing device 212 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 201, the surrounding environment, and/or their relationship(s). For example, if an object is a vehicle and the current driving environment includes an intersection, the on-board computing device 212 may predict whether the object will likely move straight forward or make a turn. If the perception data indicates that the intersection has no traffic light, the on-board computing device 212 may also predict whether the vehicle may have to fully stop prior to enter the intersection.

In various embodiments, the on-board computing device 212 may determine a motion plan for the autonomous vehicle. For example, the on-board computing device 212 may determine a motion plan for the autonomous vehicle based on the perception data and/or the prediction data. Specifically, given predictions about the future locations of proximate objects and other perception data, the on-board computing device 212 can determine a motion plan for the autonomous vehicle 201 that best navigates the autonomous vehicle relative to the objects at their future locations.

In one or more embodiments, the on-board computing device 212 may receive predictions and make a decision regarding how to handle objects in the environment of the autonomous vehicle 201. For example, for a particular object (e.g., a vehicle with a given speed, direction, turning angle, etc.), the on-board computing device 212 decides whether to overtake, yield, stop, and/or pass based on, for example, traffic conditions, map data, state of the autonomous vehicle, etc. Furthermore, the on-board computing device 212 also plans a path for the autonomous vehicle 201 to travel on a given route, as well as driving parameters (e.g., distance, speed, and/or turning angle). That is, for a given object, the on-board computing device 212 decides what to do with the object and determines how to do it. For example, for a given object, the on-board computing device 212 may decide to pass the object and may determine whether to pass on the left side or right side of the object (including motion parameters such as speed).

When the on-board computing device 212 detects an actor (i.e., an object that is capable of moving), the on-board computing device 212 will generate one or more possible trajectories for the detected actor, and analyze the possible trajectories to assess the risk of a collision between the actor and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 212 may execute one or more control instructions to perform a cautious maneuver (e.g., mildly slow down, accelerate, change lane, or swerve). In contrast, if the collision cannot be avoided, then the on-board computing device 112 may execute one or more control instructions for execution of an emergency maneuver (e.g., brake and/or change direction of travel).

As discussed above, planning and control data regarding the movement of the autonomous vehicle is generated for execution. The on-board computing device 212 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyword, a touch screen display device, a microphone, and a speaker, etc.

Figure 3:
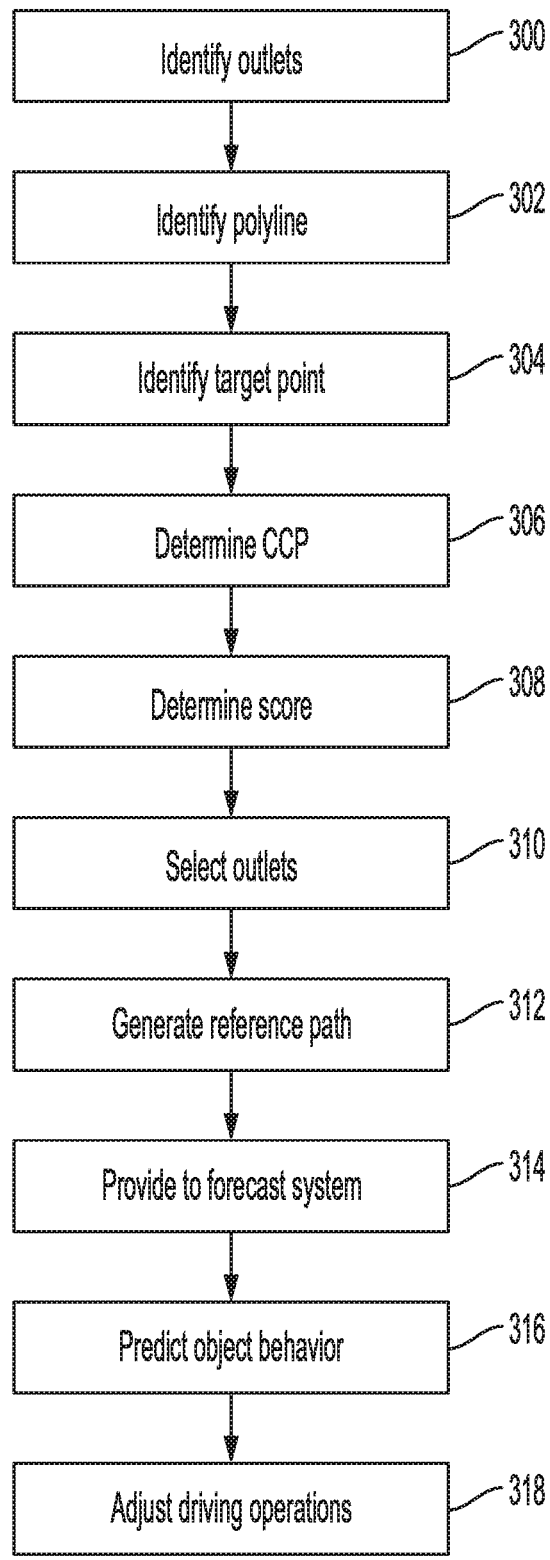
FIG. 3 illustrates a flow chart of an example process of performing outlet inference by an autonomous vehicle.

In various implementations, an autonomous vehicle may perform outlet inference to determine a set of feasible outlets for a moving object to take through an intersection, and then may generate one or more paths to those feasible outlets. FIG. 3 illustrates a flow chart of an example process of performing outlet inference by an autonomous vehicle according to an implementation.

As illustrated in FIG. 3, an autonomous vehicle may identify 300 one or more outlets from an intersection. An outlet refers to a trajectory that a moving object (e.g., an actor) may take to traverse an intersection. For example, an outlet may be a left turn, a right turn, a straight trajectory, a U-turn, and/or the like. In various implementations, an autonomous vehicle may identify 300 one or more outlets of an intersection that one or more actors are approaching or are within. The one or more actors may be actors that are present in one or more frames obtained by the autonomous vehicle. An autonomous vehicle may identify 300 one or more outlets by accessing or receiving this information from the on-board computing device of the autonomous vehicle.

For each identified outlet, the autonomous vehicle may identify 302 a representative polyline for the outlet. In various implementations, the polyline may be a centerline of a lane. The autonomous vehicle may identify 304 a target point. The target point may have a locational element (e.g., a location) and a directional element. The target point may be a point located a certain distance from an outlet. In various implementations, the target point may be located along the polyline. For instance, an autonomous vehicle may identify 304 a target point approximately ten feet from the end of the outlet. As another example, the target point may be appoint located a certain distance from an intersection polygon. Additional and/or alternate target points may be used within the scope of this disclosure.

For each identified outlet, the system may determine 306 a constant curvature path (CCP) from a center of rotation (COR) of an object to the target point for the outlet. The object may be an object other than the autonomous vehicle that is in proximity to the intersection of interest such as, for example, another vehicle, a motorcycle, a bicycle, and/or the like.

The autonomous vehicle may determine 306 a CCP by fitting a circle to the object and the target point given various constraints. The constraints may include a point constraint on the object. The COR of the object may be transformed from a map frame to an object frame where the COR is positioned at the origin.

The constraints may include a slope constraint at the COR of the object requiring the circle to pass through this point. The constraints may include another point constraint on the target point of the outlet of interest. However, there may not be a constraint on the heading or slope of the target point, meaning that the circle must pass through the target point but is not required to match its slope (direction) at that point.

In various implementations, an autonomous vehicle may determine 306 a CCP by transforming the slope and/or point constraints to an object frame. The slope and point constraints may be fitted so that the current heading of the object aligns with the +x axis, the point/slope constraint is positioned at the origin, and the slope constraint is aligned with an axis. With such a fitting, the CCP may be represented as a circle defined by the following equation:

$$y_c^2 = x^2 + (y - y_c)^2$$

where: $(0, y_c)$ is the center of the circle,
$|y_c|$ is the radius of the circle,
$(x_o, y_o)$ is the coordinate of the outlet target point in the object frame:

$$y_c = \frac{x_o^2 + y_o^2}{2y_o}$$

Figure 4A:
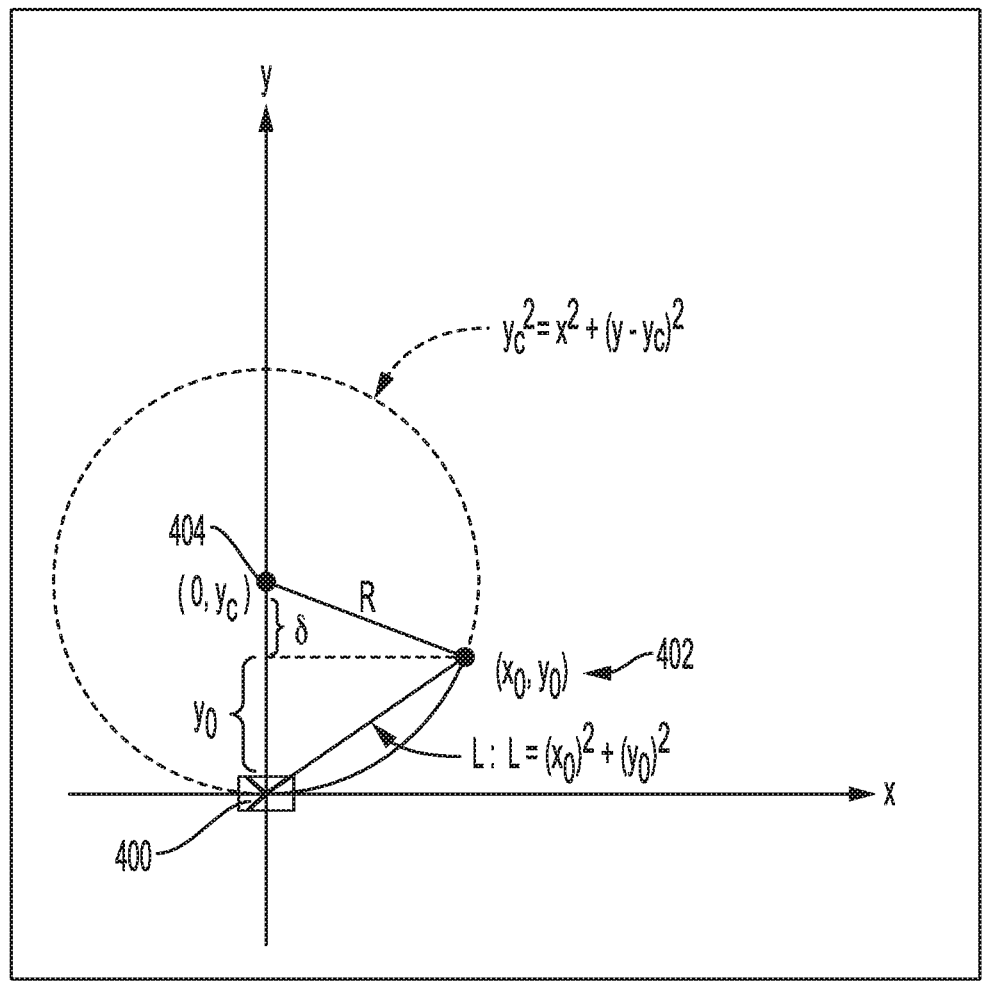
FIG. 4A illustrates a visual depiction of an example constant curvature path.

FIG. 4A illustrates a visual depiction of an example CCP according to an implementation. As illustrated by FIG. 4A, the object 400 is positioned at the origin (0, 0). The target point 402 of an outlet is positioned at $(x_0, y_0)$, and the center of the circle 404 is located at $(0, y_C)$. FIG. 4B illustrates an explanation of how the above relationships are determined according to an implementation.

In various implementations, the slope of any point along a circle of a CCP may be determined using the following relationships:

$$\frac{d}{dx}(x^2 + (y - y_c)^2) = 0$$

$$x + (y - y_c)\frac{dy}{dx} = 0$$

$$\frac{dy}{dx} = \frac{-x}{y - y_c}$$

Figure 5:
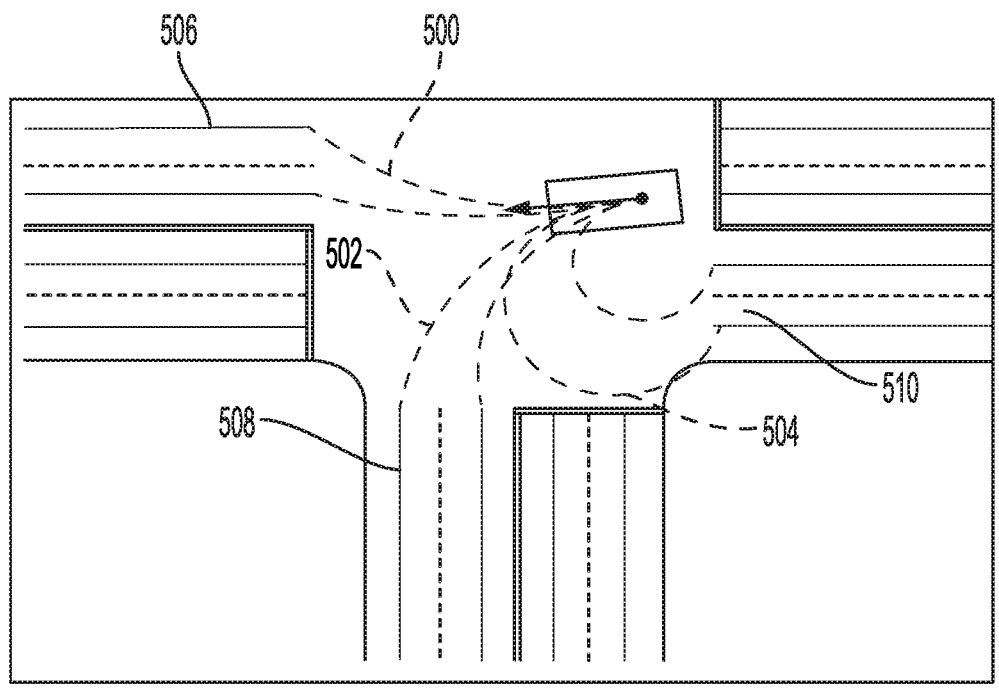
FIG. 5 illustrates example constant curvature paths.

Because of the transformation to the object frame, all outlet's CCPs and their features may be determined in parallel. FIG. 5 illustrates three example CCPs 500, 502, 504, each fit to an example outlet 506, 508, 510 according to various implementations.

Referring back to FIG. 3, an autonomous vehicle may determine 308 a score for one or more of the determined outlets. The score may represent a feasibility of a particular CCP. In various implementations, a heading disagreement at the target point of an outlet and the curvature of the CCP for the outlet may be determined and considered as part of the score determination.

Figure 6:
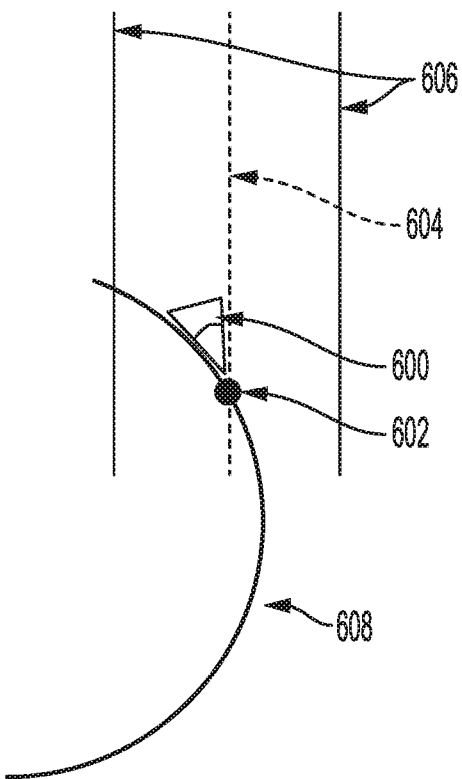
FIG. 6 illustrates an example of a heading disagreement at a target point.

As discussed above, although a circle is constrained to pass through the target point in a given outlet, there may be no slope constraint at the target point. As such, the circle does not need to be aligned with a lane at the target point, and a heading disagreement at an outlet point may exist. This heading disagreement may be used to generate a score for the circle. FIG. 6 illustrates an example of a heading disagreement 600 at a target point 602 relative to a reference polyline 604 of a lane having lane boundaries 606 according to an implementation. FIG. 6 also illustrates an example circle fit 608 for the illustrated heading disagreement.

As explained above, it instead of constraining the slope at the COR of the object, the slope may be constrained at the target point of an outlet. In this situation, a heading disagreement at the COR may exist and may be considered for the score rather than a heading disagreement at the target point.

The curvature of the CCP along with the speed of an object may determine a lateral or centripetal acceleration for the object, which may be considered in determining a score. In addition, a minimum curvature may be imposed to represent a turning radius of a typical vehicle.

A scoring function may consider lane alignment, an achievable curvature, and comfort as defined by acceleration. To account for only achievable curvatures, a high loss function may be associated with any path that requires a turning radius that is less than what is possible for a particular object type. In various implementations, a Heaviside function may be used to identify achievable curvatures. For example, a Heaviside function may return a value of '1' is the curvature of the circle is too tight for the object, otherwise it returns a value of '0'.

Comfort may be based on a normal acceleration for a path, which may be represented as (curvature*(speed)ô2).

The following illustrates an example scoring function that may be used within the scope of this disclosure:

$$\text{loss} = A_1 \delta\theta + A_2 \Theta[\kappa - \kappa_{min}] + A_3 \kappa v^2$$

Where:
$\delta\theta$ is a cosine distance (heading discrepancy);
$\Theta$ is a binary value result of a curvature Heaviside function indicating whether a curvature is feasible;
$\kappa v^2$ is the lateral acceleration of an object;
$\kappa$ is the curvature of the circle (which equals 1/radius); and
A1, A2 and A3 are coefficients that may be used to weight various parameters.

Figure 7:
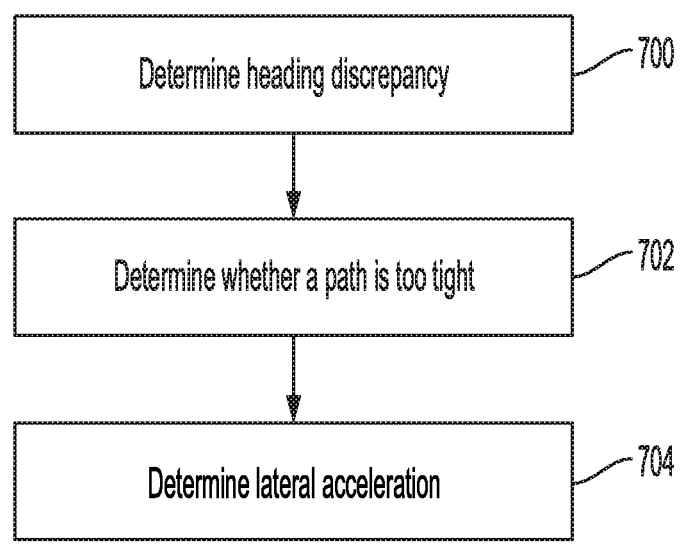
FIG. 7 illustrates a flow chart of an example process for implementing a scoring function.

FIG. 7 illustrates a flow chart of an example process for implementing the above scoring function according to an implementation. As illustrated by FIG. 7, an autonomous vehicle may determine 700 a heading discrepancy at the target point. An autonomous vehicle may determine 700 a heading discrepancy by determining a cosine distance at the target point. In various implementations, a coefficient may be applied to the heading discrepancy. The coefficient may be a result of applying a scaling factor to the heading. In certain implementations, that scaling factor may be a rejection threshold value. By way of example, a scaling factor may be represented by R. A first coefficient, A1, may be represented as A1=2R. A second coefficient, A2 may be represented as A2=R. A third coefficient, A3, may be represented as A3 32 R/5. In this example, if R=10, A1=20, A2=10, and A3=2. It is understood that additional and/or alternate scaling factors, coefficient determinations, and/or coefficient values may be used within the scope of this disclosure.

The autonomous vehicle may determine 702 whether the path for an object (e.g., an actor) to navigate to a given outlet is too tight for the object to navigate. This determination may be based on whether the path curvature associated with the circle fit described above is less than a threshold value. If it is, the system may determine that the object may comfortably reach the outlet target. If the path curvature associated with the object is not less than a threshold value, the system may determine that the actor may not reach the outlet target without a multi-point maneuver. In various implementations, a function may be used to assist with this determination. A function may take information pertaining to a particular outlet as input and may output one value if the outlet may be comfortably traversed by an actor and a different value if the outlet may not be comfortably traversed by the object. For instance, a binary function may be used.

The autonomous vehicle may determine 704 a lateral acceleration of the object. The lateral acceleration may be the product of the curvature of the outlet and the velocity squared of the object. In various implementations, the velocity may be obtained from object tracking. The score may be determined by summing the heading discrepancy (with a coefficient applied, if applicable), the curvature parameter (with a coefficient applied, if applicable), and the lateral velocity of the object (with a coefficient applied, if applicable).

Referring back to FIG. 3, the system may generate a pruned set of outlets by selecting 310 one or more of the outlets based on their associated scores. For example, the system may select 310 the outlet having the lowest score. As another example, the system may select 310 all outlets having a score that is less than a threshold value. The outlets in the pruned set may represent the most geometrically plausible paths for an object.

Identifying the most plausible outlets before generating reference paths to those outlets improves the operation of the autonomous vehicle by having it only expend computational resources developing reference paths to feasible outlets rather than all outlets for prediction or planning or forecasting.

For each outlet in the pruned set, an autonomous vehicle may generate 312 a reference path. The reference path may replace a centerline of a mapped lane segment to use in forecasting. For example, forecasting programs for autonomous vehicles commonly use reference paths defined by mapped lane segments to forecast object behavior (e.g., autonomous vehicles expect objects to follow lanes). However, the autonomous vehicle may generate 312 a reference path to use to replace mapped lane segments. As such, a generated reference path may be different from one or more mapped lane segments through the intersection.

The autonomous vehicle may generate 312 a reference path that is in the map frame (rather than the object frame). In various embodiments, an autonomous vehicle may generate 312 a curve or spline from the COR of an object to the target point of an outlet as the reference path. An example of such curve or spline may be a Bezier curve, a parametric curve that is related to the Bernstein polynomial. Given a set of n+1 control points $P_0, P_1, \ldots, P_n$, the corresponding Bezier curve is given by:

$$C(t) = \sum_{i=0}^{n} P_i \, B_{i,n}(t),$$

where $B_{i,n}(t)$ is a Bernstein polynomial and $t \in [0, 1]$.

However, it is understood that other types of curves or splines may be used within the scope of this disclosure.

Referring back to FIG. 3, the autonomous vehicle may apply 314 metadata to one or more of the newly generated reference paths. Mapped lane segments typically have metadata associated with the lanes. By generating a reference path that is not based on mapped lane segments, this metadata may be lost. Examples of metadata that may be tied to mapped lane segments may include, for example, one or more rules for who has the right of way through the intersection under various conditions, traffic rules, speed limits, and/or the like.

Figure 8:
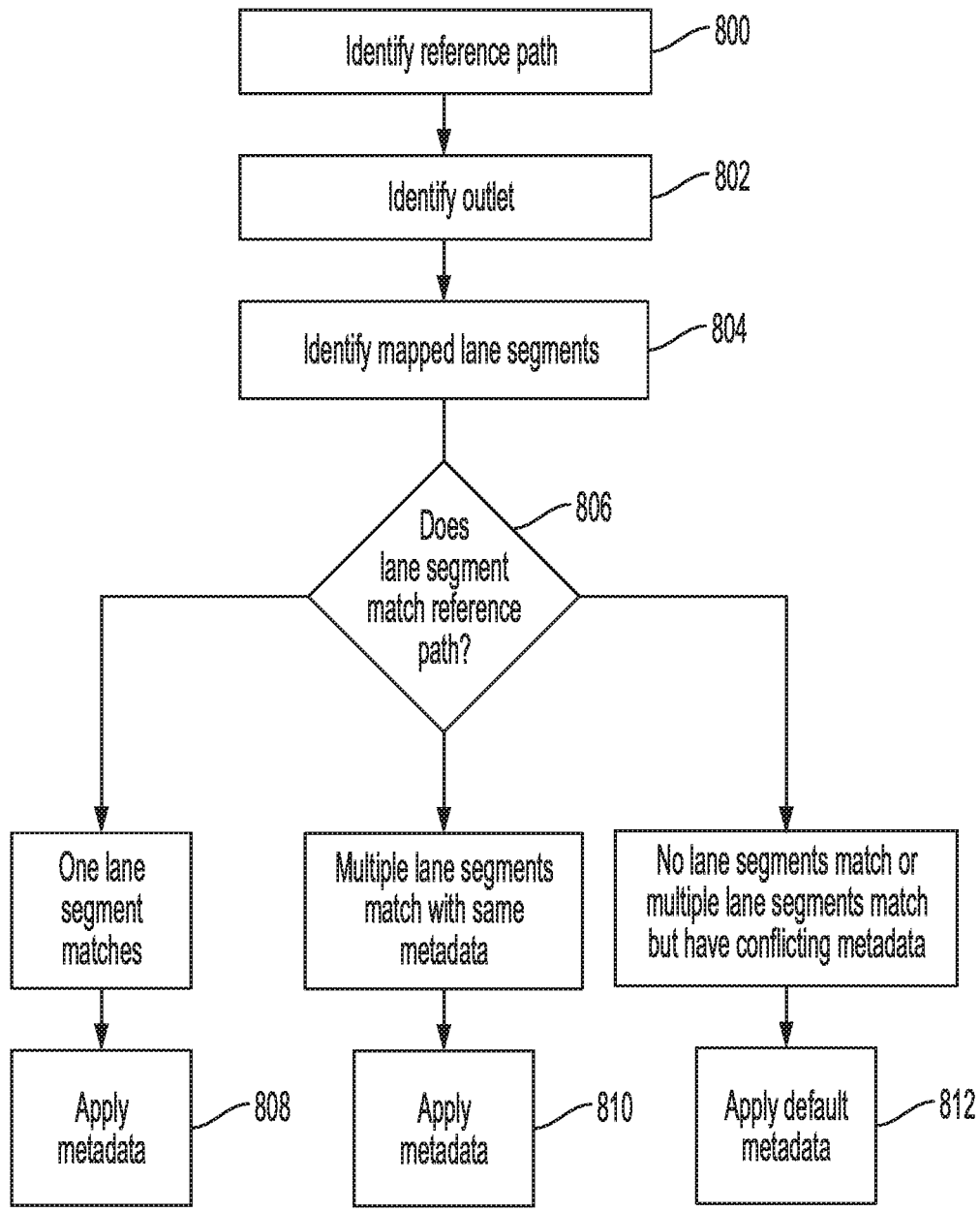
FIG. 8 illustrates a flow chart of an example method of assigning metadata to a generated reference path.

FIG. 8 illustrates a flow chart of an example method of assigning metadata to a generated reference path according to an implementation. As illustrated by FIG. 8, the autonomous vehicle may identify 800 a generated reference path. The autonomous vehicle may identify 802 an outlet associated with the reference path. It may identify 804 one or more mapped lane segments that lead to the identified outlet.

The autonomous vehicle may determine 806 whether one or more of the identified mapped lane segments match the reference path. If only one mapped lane segment matches the reference path, then the autonomous vehicle will adopt the metadata of that mapped lane segment and apply 808 it to the reference path.

If the autonomous vehicle determines that multiple mapped lane segments match the reference path, and each has the same metadata, the autonomous vehicle may adopt the metadata of one of the mapped lane segments and apply 810 it to the reference path.

If the autonomous vehicle determines that there are no mapped lane segments that match the reference path or that there are multiple mapped lane segments that match the reference path but with conflicting metadata, the autonomous vehicle may apply 812 default metadata to the reference path. The default metadata may represent one or more instructions for the autonomous vehicle to yield to everyone else in the intersection in an abundance of caution. Additional and/or alternate rules may be implemented as part of the default metadata within the scope of this disclosure.

Referring back to FIG. 3, an autonomous vehicle may provide 314 one or more of the reference paths and associated metadata to an on-board computing device to perform one or more forecasting and prediction operations. At least and portion of the reference path and metadata may be used to predict 316 the behavior of the associated object. This prediction may be performed by applying an object kinematics model to a path following controller. These models and controllers may include, for example, a pure pursuit controller, a simple-bicycle model for non-holonomic control and pure-pursuit, a probabilistic learned policy (such as one instantiated as deep (recurrent) neural networks), and/or the like.

This prediction information may be used by the on-board computing device to adjust 318 one or more driving operations of an autonomous vehicle. For example, the system may cause an autonomous vehicle to accelerate, decelerate, brake, change direction, adjust its trajectory, and/or perform one or more collision avoidance operations based on the predicted behavior of the object through an intersection.

As an example, referring back to FIG. 2, an on-board computing device may receive at least a portion of the prediction data, and may analyze it to execute or more vehicle control instructions. For instance, in response to analyzing the prediction data, an on-board computing device may execute one or more control instructions that cause the autonomous vehicle to decelerate or brake at an intersection in order to yield to the object. For example, an on-board computing device may cause one or more brakes of the autonomous vehicle to be applied. Additional and/or alternate driving operations may be performed within the scope of this disclosure.

Figure 9:
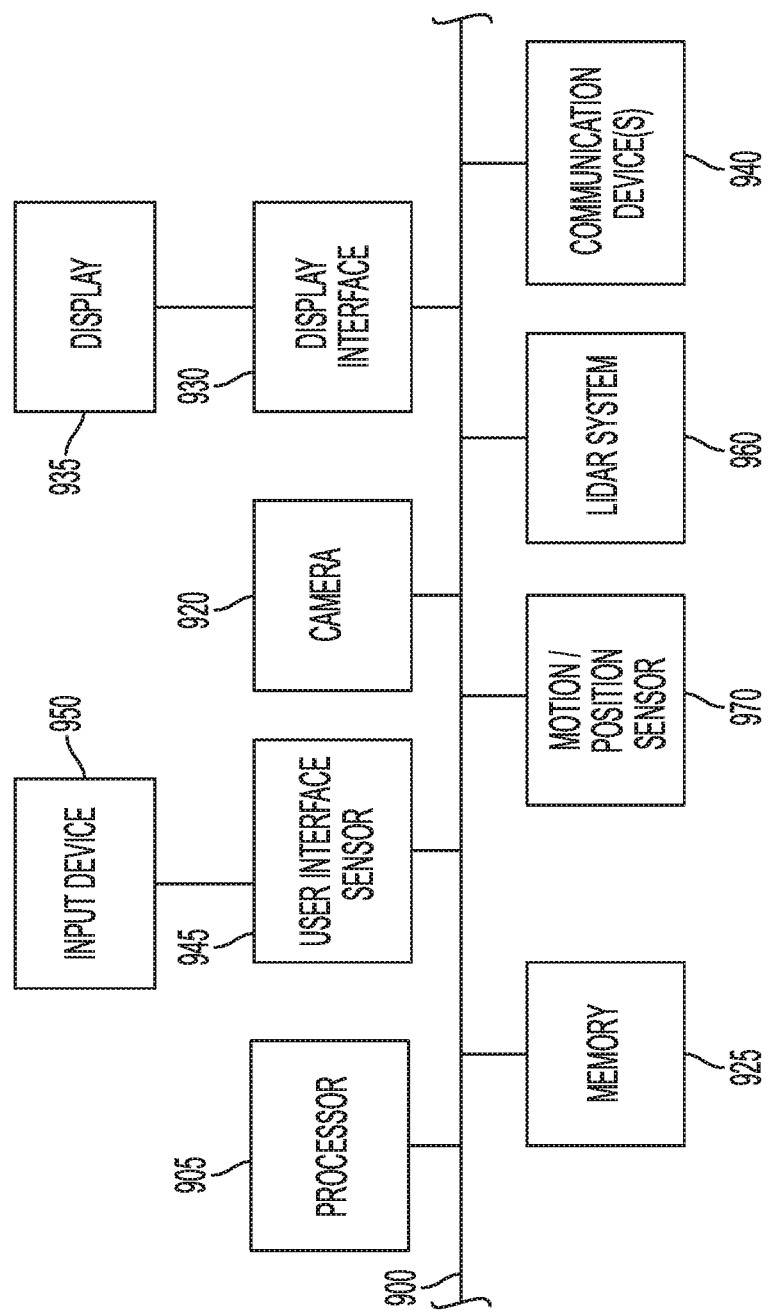
FIG. 9 is a block diagram that illustrates various elements of a possible electronic system, subsystem, controller and/or other component of an AV, and/or external electronic device.

FIG. 9 depicts an example of internal hardware that may be included in any of the electronic components of the system, such as internal processing systems of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may receive data from a LiDAR system 960 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

The terms "intersection" means a location where two or more streets meet or cross each other.

As used in this document, the term "light" means electromagnetic radiation associated with optical frequencies, e.g., ultraviolet, visible, infrared and terahertz radiation. Example emitters of light include laser emitters and other emitters that emit converged light. In this document, the term "emitter" will be used to refer to an emitter of light, such as a laser emitter that emits infrared light.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

A "mapped lane segment" refers to a representation of a lane of a street that is defined by one or more boundaries such as, for example, lane boundary lines or other markers.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object."

The term "outlet" refers to a mapped lane segment exiting an intersection.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

What is claimed is:

1. A method, comprising:
   by one or more electronic devices of an autonomous vehicle:
   identifying an intersection,
   identifying an object in proximity to the intersection,
   identifying a plurality of outlets of the intersection,
   for each outlet:
     identifying a polyline associated with the outlet,
     identifying a target point along the polyline, and
     determining a constant curvature path from the object to the target point,
   determining a score associated with each outlet based at least in part on the constant curvature path of the outlet,
   generating a pruned set of outlets that includes one or more of the outlets from the plurality of outlets based on its score, and
   for each outlet in the pruned set, generating a reference path from the object to the target point of the outlet.

2. The method of claim 1, further comprising:
   using one or more of the generated reference paths to predict a trajectory of the object through the intersection; and
   adjusting one or more driving operations of the autonomous vehicle based on the trajectory of the object through the intersection that is predicted.

3. The method of claim 1, wherein identifying a target point along the polyline comprises identifying a target point located a certain distance from an end of the outlet.

4. The method of claim 1, wherein determining a constant curvature path from the object to the target point comprises fitting a circle to the object and the target point in an object frame by:
   locating a center of rotation of the object at an origin position;
   applying a point constraint and a slope constraint on the circle such that the circle passes through the origin position; and
   applying a second point constraint on the circle such that the circle passes through the target point.

5. The method of claim 1, wherein determining a score associated with each outlet based at least in part on the constant curvature path of the outlet comprises:
   determining a heading discrepancy value;
   determining a curvature parameter;
   determining a lateral acceleration of the object; and
   summing the heading discrepancy value, the curvature parameter, and the lateral acceleration.

6. The method of claim 5, wherein determining a heading discrepancy value comprises determining a cosine distance at the target point of the outlet.

7. The method of claim 5, wherein determining a curvature parameter comprises applying a function to a curvature of the constant curvature path.

8. The method of claim 7, wherein the result of the function is a first value if the curvature of the constant curvature path is too tight to traverse the outlet, wherein the result is a second value if the curvature of the constant curvature path is not too tight to traverse the outlet.

9. The method of claim 5, wherein determining a lateral acceleration of the object comprises:
   identifying a curvature of the constant curvature path of the outlet;
   determining a velocity of the object;
   squaring the velocity of the object to generate a squared value; and
   determining a product of the curvature and the squared value.

10. The method of claim 1, wherein generating a pruned set of outlets that includes one or more of the outlets from the plurality of outlets based on its score comprises identifying one or more outlets from the plurality of outlets whose score is less than a threshold value.

11. The method of claim 1, wherein generating a reference path from the moving object to the target point of the outlet comprises generating a spline between the object and the target point in a map frame.

12. The method of claim 1, wherein one or more of the reference paths are not aligned with mapped lane segments of a map frame.

13. The method of claim 1, further comprising, for one or more of the generated reference paths:
determining one or more mapped lane segments that lead to the outlet associated with the reference path; and
determining whether one or more of the mapped lane segments match the reference path.

14. The method of claim 13, further comprising:
in response to determining that only one of the mapped lane segments match the reference path, applying at least a portion of metadata associated with the one mapped lane segment to the reference path.

15. The method of claim 13, further comprising:
in response to determining that multiple mapped lane segments match the reference path and that the multiple mapped lane segments have the same metadata, applying at least a portion of metadata associated with one of the multiple mapped lane segments to the reference path.

16. The method of claim 13, further comprising:
in response to determining that there are no mapped lane segments that match the reference path, applying default metadata to the reference path, wherein the default metadata includes one or more instructions instructing the autonomous vehicle to yield to one or more actors in the intersection.

17. The method of claim 1, wherein generating a reference path from the object to the target point of the outlet comprises generating a reference path that is different from one or more mapped lane segments through the intersection.

18. A system, comprising:
one or more electronic devices of an autonomous vehicle; and
a computer-readable storage medium comprising one or more programming instructions that, when executed, cause one or more of the electronic devices to:
identify an intersection,
identify an object in proximity to the intersection,
identify a plurality of outlets of the intersection,
for each outlet:
identify a polyline associated with the outlet,
identify a target point along the polyline, and
determine a constant curvature path from the object to the target point,
determine a score associated with each outlet based at least in part on the constant curvature path of the outlet,
generate a pruned set of outlets that includes one or more of the outlets from the plurality of outlets based on its score, and
for each outlet in the pruned set, generate a reference path from the object to the target point of the outlet.

19. The system of claim 18, wherein the computer-readable storage medium further comprises one or more programming instructions that, when executed, cause one or more of the electronic devices to:
use one or more of the generated reference paths to predict a trajectory of the object through the intersection; and
adjust one or more driving operations of the autonomous vehicle based on the trajectory of the object through the intersection that is predicted.

20. The system of claim 18, wherein the one or more programming instructions that, when executed, cause one or more of the electronic devices to identify a target point along the polyline comprise one or more programming instructions that, when executed, cause the one or more of the electronic devices to identify a target point located a certain distance from an end of the outlet.

21. The system of claim 18, wherein the one or more programming instructions that, when executed, cause one or more of the electronic devices to determine a constant curvature path from the object to the target point comprise one or more programming instructions that, when executed, cause the one or more of the electronic devices to fit a circle to the object and the target point in an object frame by:
locating a center of rotation of the object at an origin position;
applying a point constraint and a slope constraint on the circle such that the circle passes through the origin position; and
applying a second point constraint on the circle such that the circle passes through the target point.

22. The system of claim 18, wherein the one or more programming instructions that, when executed, cause one or more of the electronic devices to determine a score associated with each outlet based at least in part on the constant curvature path of the outlet comprise one or more programming instructions that, when executed, cause the one or more of the electronic devices to:
determine a heading discrepancy value;
determine a curvature parameter;
determine a lateral acceleration of the object; and
sum the heading discrepancy value, the curvature parameter, and the lateral acceleration.

23. The system of claim 22, wherein the one or more programming instructions that, when executed, cause one or more of the electronic devices to determine a heading discrepancy value comprise one or more programming instructions that, when executed, cause the one or more of the electronic devices to determine a cosine distance at the target point of the outlet.

24. The system of claim 22, wherein the one or more programming instructions that, when executed, cause one or more of the electronic devices to determine a curvature parameter comprise one or more programming instructions that, when executed, cause the one or more of the electronic devices to apply a function to a curvature of the constant curvature path.

25. The system of claim 24, wherein the result of the function is a first value if the curvature of the constant curvature path is too tight to traverse the outlet, wherein the result is a second value if the curvature of the constant curvature path is not too tight to traverse the outlet.

26. The system of claim 22, wherein the one or more programming instructions that, when executed, cause one or more of the electronic devices to determine a lateral acceleration of the object comprise one or more programming instructions that, when executed, cause the one or more of the electronic devices to:

identify a curvature of the constant curvature path of the outlet;
determine a velocity of the object;
square the velocity of the object to generate a squared value; and
determine a product of the curvature and the squared value.

27. The system of claim 18, wherein the one or more programming instructions that, when executed, cause one or more of the electronic devices to remove one or more of the outlets from the plurality of outlets based on its score to generate a pruned set of outlets comprise one or more programming instructions that, when executed, cause the one or more of the electronic devices to identify one or more outlets from the plurality of outlets whose score is less than a threshold value.

28. The system of claim 18, wherein the one or more programming instructions that, when executed, cause one or more of the electronic devices to generate a reference path from the moving object to the target point of the outlet comprise one or more programming instructions that, when executed, cause the one or more of the electronic devices to generate a spline between the object and the target point in a map frame.

29. The system of claim 18, wherein one or more of the reference paths are not aligned with mapped lane segments of a map frame.

30. The system of claim 18, wherein the computer-readable storage medium further comprises one or more programming instructions that, when executed, cause one or more of the electronic devices to, for one or more of the generated reference paths:
determine one or more mapped lane segments that lead to the outlet associated with the reference path; and
determine whether one or more of the mapped lane segments match the reference path.

31. The system of claim 30, wherein the computer-readable storage medium further comprises one or more programming instructions that, when executed, cause the one or more of the electronic devices to:
in response to determining that only one of the mapped lane segments match the reference path, apply at least a portion of metadata associated with the one mapped lane segment to the reference path.

32. The system of claim 30, wherein the computer-readable storage medium further comprises one or more programming instructions that, when executed, cause the one or more of the electronic devices to:
in response to determining that multiple mapped lane segments match the reference path and that the multiple mapped lane segments have the same metadata, apply at least a portion of metadata associated with one of the multiple mapped lane segments to the reference path.

33. The system of claim 30, wherein the computer-readable storage medium further comprises one or more programming instructions that, when executed, cause the one or more of the electronic devices to:
in response to determining that there are no mapped lane segments that match the reference path, apply default metadata to the reference path, wherein the default metadata includes one or more instructions instructing the autonomous vehicle to yield to one or more actors in the intersection.

34. The system of claim 18, wherein the one or more programming instructions that, when executed, cause one or more of the electronic devices to generate a reference path from the object to the target point of the outlet comprise one or more programming instructions that, when executed, cause the one or more of the electronic devices to generate a reference path that is different from one or more mapped lane segments through the intersection.

* * * * *